United States Patent [19]

Lazar et al.

[11] Patent Number: 5,162,981

[45] Date of Patent: Nov. 10, 1992

[54] LOW VOLTAGE D.C. TO D.C. CONVERTER

[75] Inventors: James F. Lazar, Thousand Oaks; Stephen J. Hulsey, Los Angeles, both of Calif.

[73] Assignee: Hughes Aircraft Company, Los Angeles, Calif.

[21] Appl. No.: 707,530

[22] Filed: May 30, 1991

[51] Int. Cl.$^5$ .............................. H02M 3/337
[52] U.S. Cl. ..................... 363/22; 331/113 A; 363/24; 363/56; 363/133; 363/134
[58] Field of Search .................... 363/24–26, 363/133, 134, 56, 22, 23; 331/113 A

[56] References Cited

U.S. PATENT DOCUMENTS

| | | | |
|---|---|---|---|
| 3,317,856 | 5/1967 | Wilkinson | 331/113 A |
| 4,095,128 | 6/1978 | Tanigaki | 307/254 |
| 4,829,415 | 5/1989 | Haferl | 363/26 |

FOREIGN PATENT DOCUMENTS

| | | | |
|---|---|---|---|
| 2019779 | 11/1971 | Fed. Rep. of Germany | 363/134 |
| 44387 | 4/1981 | Japan | 363/134 |

Primary Examiner—William H. Beha, Jr.
Attorney, Agent, or Firm—Leonard A. Alkov; Wanda K. Denson-Low

[57] ABSTRACT

A circuit for converting on d.c. voltage to another d.c. voltage including a transformer having a center tap and first and second end leads. A d.c. source voltage is connected to the center tap of the transformer. The end leads are connected to ground through first and second MOSFETs and to the gate of the MOSFET through which the other end lead is connected to ground such that the circuit is nominally self-oscillating due to transformer saturation. Current spikes may be minimized with a control circuit, consisting of an oscillator, a flip-flop, and first and second transistors, connected to the gates of the first and second MOSFETs. The control circuit turns the MOSFETS off prior to their natural oscillation turn off caused by transformer saturation. The circuit is particularly suited to operation with a low voltage d.c. source and low voltage MOSFETS.

4 Claims, 2 Drawing Sheets

LOW VOLTAGE D.C. TO D.C. CONVERTER

BACKGROUND OF THE INVENTION

1. Field of the Invention

The present invention relates generally to power converters and, more particularly, to a d.c. to d.c. converter that can provide various d.c. output voltages from a single d.c. voltage source.

2. Description of Related Art

Conventional d.c. to d.c. converters are comprised of two major components: a transformer and fast-switching, high-current, high-voltage transistors. The basic operation is to convert the voltage from a d.c. power source to a.c. square wave power at the transformer primary. The square wave power available at the transformer secondary is then rectified to generate a desired d.c. output voltage.

There are two primary type of d.c. to d.c. converters: driven converters and self-oscillating converters:

A conventional driven d.c. to d.c. converter, shown in FIG. 1, is comprised of two transistors Qa, Qb that are alternately switched on by an external square wave drive signal. It can be appreciated that the external square wave drive signal results in square waves of voltage and current at the transistor collectors. In other words, current flows in each transistor Qa, Qb on alternate half cycles of the external square wave drive signal.

The problems that are associated with a conventional driven d.c. to d.c. converter like that shown in FIG. 1 include: (1) bipolar transistors require base drive current that is dissipative; (2) bipolar transistors have saturation losses larger than that associated with MOS-FETs; (3) output load regulation is hampered by varying Vce(sat): and (4) MOSFETs can be operated at higher switching frequencies, thereby reducing magnetic size.

FIG. 2 depicts a conventional self-oscillating d.c. to d.c. converter comprised of a d.c. source Vcc, a pair of BJT transistors Qc, Qd, and a transformer Tr1. The primary of transformer Tr1 includes a main center tapped winding NP1:NP2 and an auxiliary center tapped winding NB1:NB2. The transistors Qc, Qd are operated as switches via a feedback connection between the auxiliary base winding NB1:NB2 each transistor base.

The operation of the conventional dc/dc converter is as follows: Assume that transistor Qc begins to turn on as current flows to its base from the DC source Vcc through RB1 and base winding NB1. As transistor Qc turns on and begins to saturate, current from the DC source Vcc begins to flow to ground through the primary winding NP1 and the collector/emitter junction. The voltage impressed on the primary winding NP1 is Vcc-Vce(sat) or, approximately, Vcc-1. A transformer coupling exists between the primary winding NP1 and the base winding NB1. Thus, the voltage induced across NB1 is (NB1/NP1)(Vcc-1).

While current is flowing through the primary winding NP1, the transistor Qc is held on because of the positive voltage induced in the base winding NB1. However, once the transformer core saturates, the voltage across the primary winding NP1 drops to zero, forcing the voltage at the collector of Qc to be forced to near Vcc. If the voltage across the primary winding NP1 collapses, so does the voltage across the base winding NB1.

As all of the winding voltages collapse to zero, Qd is turned partially on as the current from R3 is partially diverted into its base. As current is drawn through the collector of Qd, a voltage starts to appear across primary winding NP2 and, by transformer action, also across base winding NB2. The transistor Qd saturates as the voltage across the base winding NB2 provides additional drive to the base of Qd. As before, the transformer core saturates, the winding voltages collapse, and drive current begins to appear at the base of Qc.

The just-described conventional dc/dc converter is relatively expensive because it requires a transformer having a plurality of primary windings in order to generate the base drive currents. Moreover, relatively durable components are needed because of the large current spikes created when the voltages on the windings of the saturated transformer core collapse. These inherent current spikes induce additional electromagnetic interference. The frequency of oscillation in such a self-oscillating converter is difficult to design and control since it is a function of temperature, component, and voltage supply tolerances. Finally, these conventional circuits require additional "bump start" components, such as a diode $D_B$ and a resistor $R_B$, to initiate oscillations at power up.

SUMMARY OF THE INVENTION

In recognition of the problems intrinsic to the conventional driven and self-oscillating d.c. to d.c. converters:

It is an object of the present invention to provide a d.c. to d.c. converter that operates with an ordinary inexpensive single primary transformer;

It is a further object of the present invention to minimize or eliminate current spikes in a d.c. to d.c. converter by preventing the transformer from saturating; and It is a further object of the present invention to provide a d.c. converter that can operate with a relatively low d.c. voltage source.

The present invention achieves the above objects by providing a d.c. to d.c. converter for converting a first d.c. voltage to a second d.c. voltage comprising: a transformer including at least a primary winding and a secondary winding, the primary winding comprised of first and second end leads and a center lead, the center lead being connected to a d.c. voltage source; and means for repetitively and alternately grounding the first and second end leads to generate a current between the center lead and a grounded one of the first and second end leads and to generate an autotransformer voltage across a nongrounded one of the first and second primary end leads, said means for repetitively and alternately grounding comprising: first and second voltage controlled switches connected between ground and the first and second end leads, respectively, the first and second voltage controlled switches having first and second control inputs, respectively, for activating the voltage controlled switches; means for connecting the first end lead to the second control input and means for connecting the second end lead to the first control input, whereby the autotransformer voltage generated across the nongrounded end lead is provided to the control input of the voltage controlled switch connected to the grounded end lead to maintain the latter voltage controlled switch in an activated state; and control means for alternately connecting the first and second control inputs to ground to turn off the voltage controlled switches before the transformer saturates.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

DESCRIPTION OF THE PREFERRED EMBODIMENTS

The following description is provided to enable any person skilled in the art to make and use the invention and sets forth the best modes contemplated by the inventors of carrying out their invention. Various modifications, however, will remain readily apparent to those skilled in the art, since the generic principles of the present invention have been defined herein specifically to provide a low voltage d.c. to d.c. converter.

Figure 1:
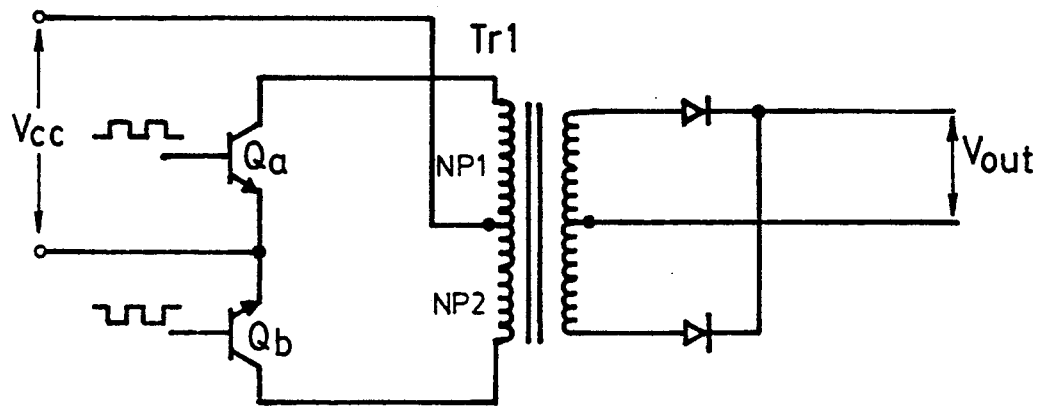
FIG. 1 is a circuit diagram of a conventional driven d.c. to d.c. converter.
Figure 2:
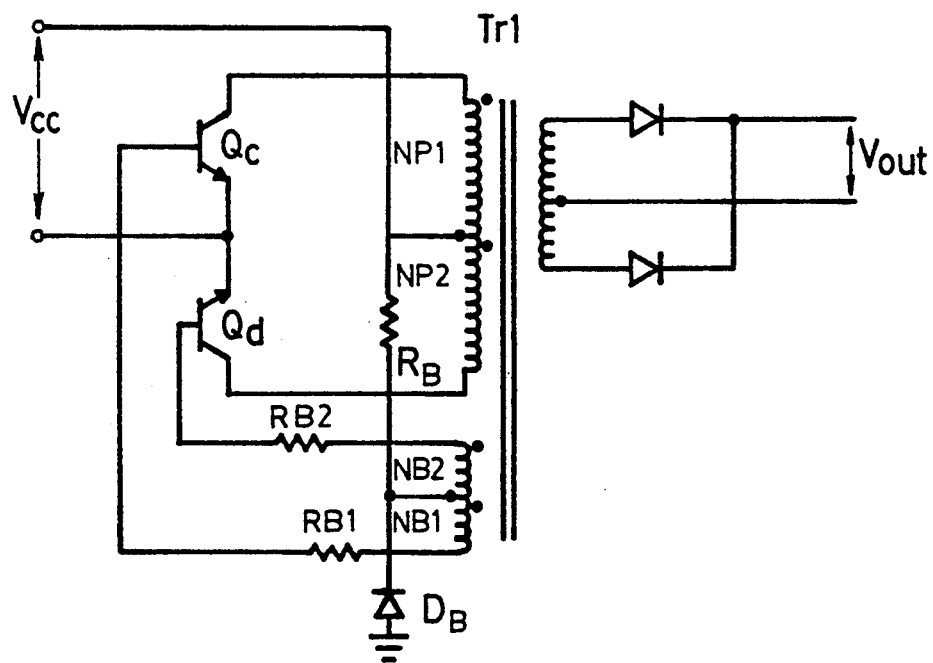
FIG. 2 is a circuit diagram of a conventional self-oscillating d.c. to d.c. converter.
Figure 3:
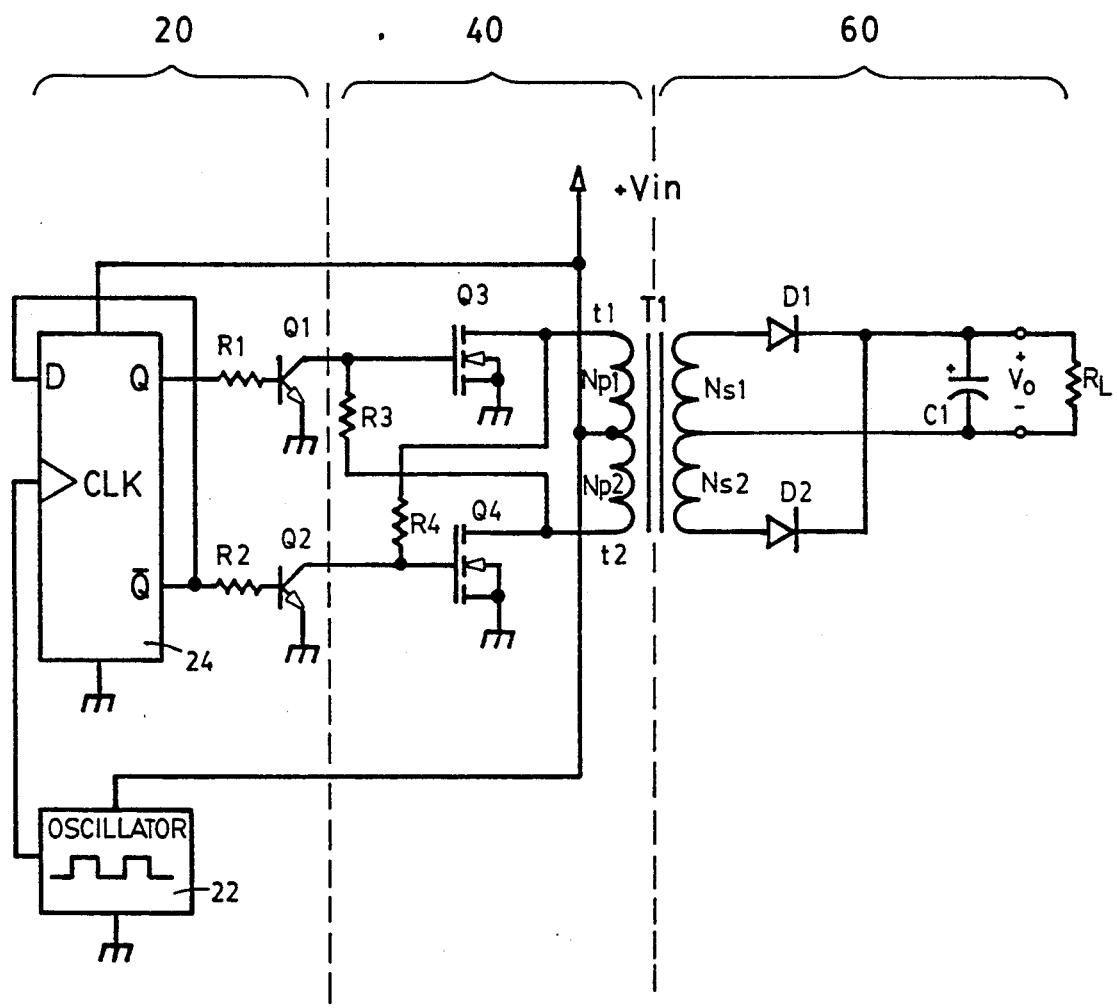
FIG. 3 is a circuit diagram of a low voltage d.c. to d.c. converter according to the present invention.

Referring to FIG. 3, a d.c. to d.c. converter according to the present invention is shown to have a primary side 20, 40 and a secondary side 60 separated by a transformer T1. The secondary side 60 is comprised of the transformer's secondary winding Ns1:Ns2, the output of which is rectified with diodes D1, D2, smoothed with a capacitor C1, and applied to a load $R_L$. The operation of the components which comprise the secondary side will not be described in detail as such operation is believed to be within the knowledge of those skilled in the art. It is believed sufficient to note that there are many other circuit constructions suitable for generating a regulated d.c. voltage from an alternating source of power.

The primary side is best understood by describing it in two functional stages: a control stage 20 and an oscillating power stage 40. The control stage 20 is comprised of two transistors Q1, Q2 connected in a common emitter fashion. The oscillating power stage 40 is comprised of a transformer T1 having a single center tapped primary Np1:Np2, first and second Field Effect Transistors (FETs) Q3, Q4, and first and second feedback resistors R3, R4.

The oscillating power stage 40 earns its name because it will self-oscillate even if separated from the driving stage 20 (i.e., as if transistors Q1 and Q2 are off). In general, the two MOSFETs Q3, Q4 oscillate in opposition to one another and thereby draw current through alternate half windings Np1, Np2 of the transformer primary.

The control stage 20 earns its name because it inhibits or controls the oscillation of the oscillating power stage 40. More specifically, the collectors of the transistors Q1, Q2 are connected to the gates of the MOSFETs Q3, Q4, respectively, so that the control stage 20 may periodically turn off alternate MOSFETs Q3, Q4 by shorting its gate to ground.

To fully understand the operation of the oscillating power stage 40, it is best to review the construction and operation of MOSFETs. A MOSFET is comprised of a gate, a source, and a drain and is generally considered a voltage controlled current device because a voltage at the gate can be used to control the flow of current between the source and the drain. The gate of a MOSFET is comparable to a capacitor and is a high impedance.

A MOSFET's turn-on characteristics can generally be described by two parameters: Vgs(th) and Rds(on). If Vgs is below Vgs(th), then essentially no current will flow between the drain D and the source S. However, if Vgs is increased above Vgs(th), then a low impedance channel is formed between the drain D and the source S and current may flow therebetween. With its source grounded, a MOSFET can be operated as a switch by driving its gate between zero and Vgs(sat), where Vgs(sat) is the voltage at which Rds(on) for the device is specified.

For low input voltage operation, the preferred MOSFETs are "Logic Level L Series" HEXFETs ® manufactured by International Rectifier. These devices are characterized by Vgs(th)=2.0 V (max) and Rds(on)=0.05 ohms.

The operation of the self-oscillating power stage 40 will now be described. At power up, virtually no current flows in the gate of either MOSFET Q3, Q4, such that a voltage Vin is present at the gate of each MOSFET. By ensuring that Vin> =Vgs(th), one of the two MOSFETs Q3, Q4 will begin to turn on as power up. However, only one MOSFET may be on at a time since the gate of each MOSFET is connected to ground through the other MOSFET. Therefore, the MOSFET that first begins to turn on will force the other MOSFET off.

For the sake of argument, we will assume that first MOSFET Q3 begins to turn on first. As the first MOSFET Q3 is turning on and drawing current from the first primary terminal t1, an voltage is induced in the first half winding Np1. This voltage magnetically induces an autotransformer voltage in the second half winding Np2, thereby driving the first MOSFET Q3 further into saturation via the positive feedback connection to its gate. Eventually, the core of the transformer T1 will saturate and turn the first MOSFET Q3 off by shorting its gate to ground through the transformer T1 windings. Once the first MOSFET Q3 turns off, the gate of the second MOSFET Q4 is no longer connected to ground through the first MOSFET Q3. The second MOSFET Q4 therefore begins to turn on as the energy stored in the transformer windings is redirected to its gate.

As the second MOSFET Q4 begins to turn on and draw current from the second primary terminal t2, an inductive voltage is induced in the second half winding Np2. This inductive voltage magnetically induces an autotransformer voltage in the first half winding Np1, thereby driving the second MOSFET Q4 further into saturation via the positive feedback connection to its gate. Eventually, the core saturates, and the process repeats.

Although the present invention will operate without the driving circuit 20, it is believed undesirable for all of the reasons associated with the conventional oscillating d.c. to d.c. converters. In general, the current spikes put unnecessary strain on the MOSFETs and create undue electromagnetic interference. The control circuit 20 is provided to prevent current spikes by turning off the MOSFETs Q3, Q4 before the transformer T1 core saturates.

A preferred embodiment of the control circuit 20 is comprised of an oscillator 22, a flip-flop 24, first and second transistors Q1, Q2, and first and second resistors R1, R2. As shown in FIG. 3, the Q and Q(not) outputs of the flip-flop 24 are connected to the respective bases of the first and second transistors Q1, Q2 with the first and second resistors R1, R2. The Q(not) output is also fed back to the D input such that the logic states of the Q and the Q(not) outputs alternate on each clock pulse. The oscillator 22 drives the clock input of the flip-flop 24, to thereby alternately turn the transistors Q1 and Q2 on and off. The collectors of the transistors Q1, Q2 are connected to a gate of a respective one of the MOSFETs Q3, Q4.

The transistors Q1 and Q2 are used to minimize current spikes by turning the MOSFETs Q3 and Q4 off before the transformer T1 core saturates. The frequency of the oscillator 22 must therefore exceed the natural oscillation frequency of the oscillating power stage 40.

As will be apparent to those skilled in the art, various modifications and adaptations of the preferred embodiment may be made without departing from the scope and spirit of the invention. It is therefore to be understood that, within the scope of the appended claims, the invention may be practiced other than as specifically described herein.

What is claimed is:

1. A. d.c. to d.c. converter for converting a first d.c. voltage to a second d.c. voltage comprising:
    a transformer including at least a primary winding and a secondary winding, the primary winding comprising of first and second end leads and a center lead, the center lead being connected to a d.c. voltage source; and
    means for repetitively and alternatively grounding the first and second end leads to generate a current between the center lead and a grounded one of the first and second end leads and to generate an auto transformer voltage across a nongrounded one of the first and second primary end leads, said means for repetitively and alternately grounded comprising:
        first and second voltage controlled switches connected between ground and the first and second end lead, respectively, the first and second voltage controlled switches having first and second control inputs, respectively, for activating the voltage controlled switches and wherein said first and second voltage controlled switches may be deactivated by grounding said first and second inputs, respectively;
        means for connecting the first end lead to the second control input and means for connecting the second end lead to the first control input, whereby the auto transformer voltage generated across the nonground end lead is provided to the control input of the voltage controlled switch connected to the grounded end lead to maintain the latter voltage controlled switch in an activated state; and
        control means for alternately connecting the first and second control inputs to ground to turn off the voltage controlled switches before the transformer saturates and wherein the control means is comprised of:
            first and second transistors having first and second base inputs, respectively,
            means for connecting the first transistor to the first control input,
            means for connecting the second transistor to the second control input, and
            means for repetitively and alternately providing control signals to said first and second base inputs to repetitively and alternately ground the first and second control inputs through said first and second transistors, respectively, wherein said means for repetitively and alternately providing control signals is comprised of a digital flip-flop having first and second outputs and a clock input and a second input, a voltage level at each of said first and second outputs alternating between one of two voltage levels each time a clock signal is applied to the clock input, said first output being connected to said first base input and said second output being connected to said second base input and said second output also fed back as said second input to said digital flip-flop.

2. The d.c. to d.c. converter of claim 1 wherein said control means is further comprised of an oscillator having an output connected to the clock input of said flip-flop.

3. A circuit for converting a first d.c. voltage to a second d.c. voltage comprising:
    a d.c. voltage source;
    a transformer including at least a primary winding and a secondary winding, the primary winding having first and second end leads and a center lead;
    first and second MOSFETs, each having gate, a drain, and a source;
    first and second resistors;
    means for connecting the d.c. voltage source to the center lead;
    means for connecting the drain and the source of the first MOSFET between the first end lead and ground;
    means for connecting the drain and the source of the second MOSFET between the second end and ground;
    means for connecting the first resistor between the gate of the first MOSFET and the second end lead;
    means for connecting the second resistor between a gate of the second MOSFET and the first end lead;
    first and second transistors having first and second base inputs, respectively;
    means for connecting the first transistor between the gate of the first MOSFET and ground;
    means for connecting he second transistor between the gate of the second MOSFET and ground; and
    means for repetitively and alternately providing control signals to said first and second base inputs to repetitively and alternately ground the gates of said first and second MOSFETs through said first and second transistors, respectively wherein said means for repetitively and alternately providing control signals is comprised of a digital flip-flop having first and second outputs and a clock input and a second input, a voltage level at each of said first and second outputs alternating between one of two voltage levels each time a clock signal is applied to the clock input, said first output being connected to said first base input and said second output being connected to said second base input and said second output also fed back as said second input to said digital flip-flop.

4. The circuit of claim 3 further comprising an oscillator having an output connected to the clock input of said flip-flop.

* * * * *